United States Patent [19]

Ragland, Jr.

[11] 4,403,797
[45] Sep. 13, 1983

[54] FISHING LINE KNOT TYING TOOL

[76] Inventor: Ewing Ragland, Jr., 841 Scott, Del City, Okla. 73115

[21] Appl. No.: 355,980

[22] Filed: Mar. 8, 1982

[51] Int. Cl.³ .............................................. D03J 3/00
[52] U.S. Cl. .......................................... 289/17; 43/4
[58] Field of Search ................. 289/1.2, 1.5, 17; 43/1, 43/4

[56] References Cited

U.S. PATENT DOCUMENTS

| | | | |
|---|---|---|---|
| 2,758,858 | 8/1956 | Smith | 289/17 |
| 3,321,225 | 5/1967 | Miller | 289/17 |
| 3,401,967 | 9/1968 | Glowka | 289/17 |
| 3,837,691 | 9/1974 | Smythe | 289/17 |
| 4,101,152 | 7/1978 | Gardipee | 289/17 |
| 4,188,052 | 2/1980 | Browning | 289/17 |

FOREIGN PATENT DOCUMENTS 260323  5/1963  Australia .............................. 289/17
993815  6/1965  United Kingdom .................. 289/17

Primary Examiner—Louis Rimrodt
Attorney, Agent, or Firm—Robert K. Rhea

[57] ABSTRACT

In a hand held tool for tying a knot connecting a fishing line to the eye of a fishhook, an elongated generally planar body, is provided with a fishhook supporting forwardly projecting tube and a pair of resilient fins diverging from its rearward end. A laterally projecting lug having a transverse slot holds an intermediate portion of the line. The line free end, after being threaded through the eye of the fishhook, is entrained transversely across the tips of the diverging fins and wrapped a plurality of times about the tube and extended through the opening formed by the fins and line and secured by a slot at the juncture of the fins. The knot and fishhook is then removed forwardly off the tube and the knot tightened against the eye of the fishhook.

4 Claims, 4 Drawing Figures

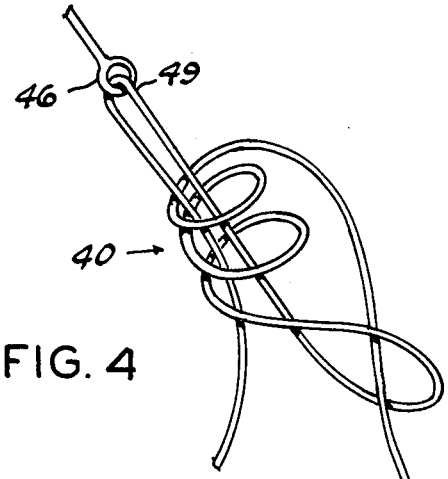
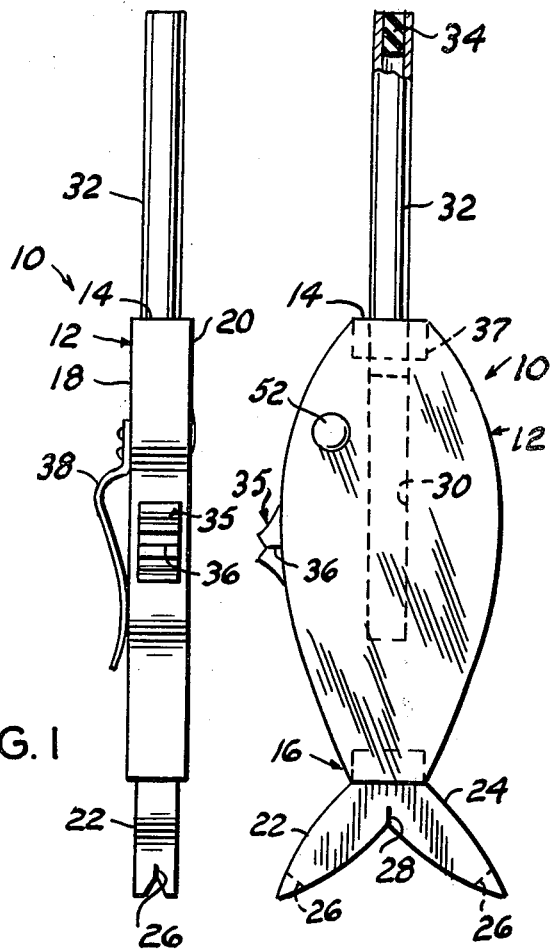
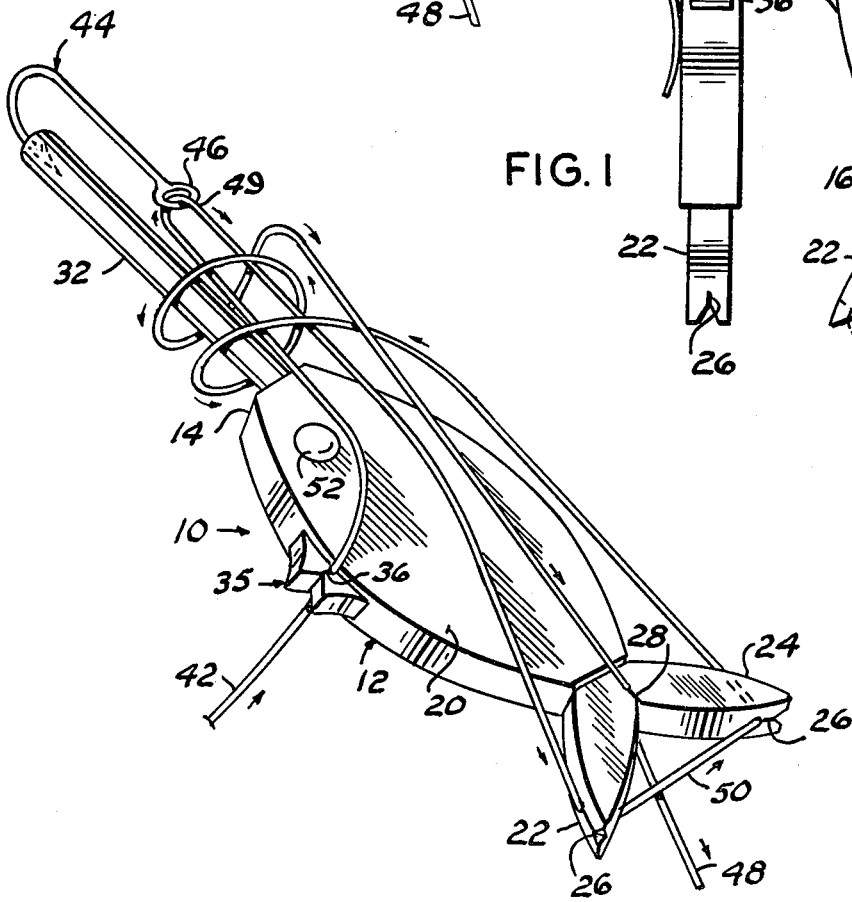

4,403,797

FISHING LINE KNOT TYING TOOL

BACKGROUND OF THE INVENTION

1. Field of the Invention

The present invention relates to fishing line knot tying jigs or tools and more particularly to a hand held tool for tying knots utilized by fishermen in securing hooks, swivels, leaders or lures, to a fishing line.

Tying a fishing line knot to a fishing attachment is many times a difficult tedious task. The problem is often aggravated by cold weather when the fingers and hands are numb or if the fisherman is afflicted with arthritis manipulating the line is further difficult.

This invention provides a tool which will hold both the fishing line and the article to which the line is being tied while tying the knot.

2. Description of the Prior Art

Most pertinent prior patent is believed U.S. Pat. No. 4,101,152 which discloses a knot tying jig featuring slots at its respective ends, holding loops or bight portions of the line and further provides a transverse notch in one side edge adjacent its forward end through which the free end of the line must be passed to complete the knot.

This invention provides a tool easily held in either hand which supports a fishhook, swivel or other article, at its forward end thus in effect forming a "third hand" supporting the fishhook or swivel and a portion of the line while the free end portion of the line is manipulated to tie the knot without the necessity of the fisherman inserting the line through a small opening or slot other than the eye of a fishhook or loop of a swivel.

SUMMARY OF THE INVENTION

A generally fish-shaped planar body, capable of being held in one hand, is provided with diverging fishtail-like fins having slots therein at one end portion and having a small tube projecting longitudinally beyond its other end. A dorsal-like fin projects from one side of the body intermediate its ends. The free end of the tube supports the hook end of a fishhook permitting the end portion of a fishing line, opposite the reel, to be inserted into and held by a slot in the dorsal fin so that the free end portion of the line may be threaded through the fishhook eye and entrained across the tip end portions of the fishtail fins and wrapped a plurality of times around the forwardly projecting tube with the free end of the line then inserted through the opening defined by the line extending across the tail fins and gripped by a slot between the fins. The knot being completed by sliding the line off the tail fins and out of the dorsal fin slot to take up slack. The knot is then removed from the tube, with the fishhook, by sliding axially off the tube.

The principal object of this invention is to provide a knot tying tool for fishermen in which a stevedore type knot may be easily and quickly tied in a fishing line threaded through a fishhook, swivel, or the like.

BRIEF DESCRIPTION OF THE DRAWINGS

FIG. 1 is an elevational edge view of the tool;

FIG. 2 is a right side elevational view, partially in section, of FIG. 1;

FIG. 3 is a perspective view of the tool supporting a fishhook and illustrating a fishing line loosely forming a stevedore knot; and, FIG. 4 is a fragmentary perspective view of the knot and fishhook when removed from the tool prior to tightening the knot adjacent the fishhook eye.

DESCRIPTION OF THE PREFERRED EMBODIMENT

Like characters of reference designate like parts in those figures of the drawings in which they occur.

In the drawings:

The reference numeral 10 indicates the tool, as a whole, comprising a stylized fish-shaped planar body 12 having a forward end 14, a rearward end portion 16 and opposing flat surfaces 18 and 20. The rearward end portion 16 is characterized by a pair of diverging wings or fins 22 and 24, each having a slot 26 formed in its outermost end portion parallel with the plane of the body. Similarly, a slot 28, normal to the plane of the body, is formed at the juncture of the fins. The body 12 is centrally drilled longitudinally, as at 30, from its forward end 14 with the bore terminating forwardly of the rearward end portion 16. The bore 30 longitudinally slidably receives a tube 32. The length of the tube 32 is substantially equal to the depth of the bore 30 to store the tube when the device is not being used. The forward end of the tube is provided with a resilient plug 34 for the purposes presently explained.

The body is further provided with a dorsal fin-like lateral projection 35 at one of its side edges intermediate its ends which is tranversely slotted, as at 36, normal to the plane of the body. The body 12 may be formed from semirigid material, such as hard rubber, or, if formed from other nonyielding material, such as wood or metal, the fins 22–24 and lateral projection 35 are formed from yieldable rubber-like material inserted into cooperative slots in the body or bonded thereto. In this event a resilient sleeve 37 is placed in the forward end portion 14 of the body around the tube 32, for frictionally supporting one end portion of the tube within the body. The body is further preferably provided with a spring clip 38 on one of its sides, for example its side 18, for supporting the tool 10 on a fisherman's belt, or the like, when not in use. The clip 38 may include cutters, such as finger nail clippers, not shown, for cutting a fishing line. The tool is used for tying a stevedore knot 40, or the like, in a fishing line 42 connecting the line to a fishhook 44 or other fishing equipment having a loop or eye therein.

The line is tied to a fishhook eye 46 by inserting the hook of the fishhook into the resilient plug 34 at the forward end of the tube 32 so that the tube supports the fishhook shank parallel with the tube 32 with the eye 46 projecting toward the flat side 20 of the tool. The end portion of the line opposite the reel, for example some 6 to 8 inches from the end 48 of the line, is resiliently inserted into and held by the slot 36 of the projection 35. The end of the line 48 is then inserted through the fishhook eye 46 and extended rearwardly of the body, forming a bight portion 49, and entrained across the tips of the fins 22 and 24 (FIG. 3) by forcing the line into the fin slots 26 and forming a bight portion 50. The line end portion is then extended forwardly of the body and wrapped a plurality of times, preferably at least two, around the tube and line bight portion 40. The free end portion of the line is then extended rearwardly of the body and inserted into the spacing between the fins and the line bight portion 50 and forced into the fin slot 28. Thereafter, the fishing line is removed from the fin slots 26 and out of the lateral projection slot 36 so that excess slack in the tied knot may be taken up. The knot and fishhook is then removed from the body by sliding the knot and fishhook as a unit forwardly off the tube 32 wherein the knot is in substantially the position shown by FIG. 4. The final step is to tighten the knot against the fishhook eye by pulling on the reel connected end portion of the line and clipping off any excess line at the free end portion of the line adjacent the knot.

The body is also provided with a conventional thumb tack 52, or the like, inserted into one side of the body or a resilient plug therein. The purpose of the thumb tack is to insert the prong of the thumb tack through the loop of a swivel, or the like, and insert the thumb tack into the resilient plug 34 at the forward end of the tube 32 for the purposes of holding the swivel while tying the line 42 thereto in the manner described hereinabove.

Obviously the invention is susceptible to changes or alterations without defeating its practicability. Therefore, I do not wish to be confined to the preferred embodiment shown in the drawings and described herein.

I claim:

1. A hand held tool for tying a fishing line to the eye of a piece of fishing tackle, comprising:
    an elongated planar body having a forward end and a rearward end;
    a resilient projection protruding laterally from one side edge of the body and having a transverse slot therein normal to the plane of the body for frictionally holding an intermediate portion of a fishing line;
    elongated tube means projecting longitudinally forward of the body for supporting a piece of fishing tackle and for threading a free end portion of a fishing line through the eye thereof and forming a forward doubled back line bight portion adjacent the tube and enable a free end portion of the line to be wrapped around the tube and doubled back line bight portion; and,
    a pair of fins diverging rearwardly from the rearward end and in the plane of said body;
    said fins each having a pointed rearward tip end transversely slotted parallel with the plane of the body for frictionally holding an intermediate portion of the fishing line when strung therebetween forming a rearward line bight portion defining an opening in combination with the rearward fins through which a free end portion of the fishing line is passed.

2. The tool according to claim 1 in which said tube means includes:
    a tube having a length at least greater than the shank length of a fishhook to be tied to a fishing line; and,
    a resilient plug closing the forward end portion of said tube for frictionally receiving the hook portion of a fishhook and supporting the shank thereof substantially parallel with the axis of said tube.

3. The tool according to claim 1 in which said tube means includes:
    a tube having a length at least greater than the length of a piece of fishing tackle to be tied to a fishing line;
    a resilient plug closing the forward end portion of said tube; and,
    a thumb tack normally supported by one side surface of a said body,
    said thumb tack having a prong capable of entering said resilient plug and supporting one end portion of a piece of fishing tackle to be tied to a fishing line.

4. The tool according to claim 2 or 3 in which said body is provided with a longitudinal bore extending inwardly from its forward end a distance substantially equal to the length of said tube.

* * * * *